US009779199B2

(12) United States Patent
Schmalenberg et al.

(10) Patent No.: US 9,779,199 B2
(45) Date of Patent: Oct. 3, 2017

(54) CIRCUIT BOARDS WITH THERMAL CONTROL AND METHODS FOR THEIR DESIGN

(71) Applicant: Toyota Motor Engineering & Manufacturing North America, Inc., Erlanger, KY (US)

(72) Inventors: Paul D. Schmalenberg, Ann Arbor, MI (US); Ercan M. Dede, Ann Arbor, MI (US); Tsuyoshi Nomura, Nagoya (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 432 days.

(21) Appl. No.: 14/340,886

(22) Filed: Jul. 25, 2014

(65) Prior Publication Data
US 2016/0029476 A1   Jan. 28, 2016

(51) Int. Cl.
*G06F 17/50* (2006.01)
*H05K 1/02* (2006.01)
*H05K 3/00* (2006.01)

(52) U.S. Cl.
CPC ....... *G06F 17/5077* (2013.01); *H05K 1/0203* (2013.01); *G06F 17/5081* (2013.01);
(Continued)

(58) Field of Classification Search
CPC ............ G06F 17/5081; G06F 17/5077; G06F 2217/78; G06F 2217/80; H05K 1/0203;
(Continued)

(56) References Cited

U.S. PATENT DOCUMENTS 5,074,037 A    12/1991   Sutcliffe et al.
5,550,750 A     8/1996   Wolff
(Continued)

OTHER PUBLICATIONS

Dede, "Simulation and Optimization of Heat Flow Via Anisotropic Material Thermal Conductivity," Computational Materials Science, 50 (2010) pp. 510-515.
(Continued)

*Primary Examiner* — Phallaka Kik
(74) *Attorney, Agent, or Firm* — Dinsmore & Shohl LLP

(57) ABSTRACT

Circuit boards and computer-implemented methods for designing circuit boards are disclosed. In one embodiment, a method of designing a circuit board having an insulator substrate includes determining, by a computer, a plurality of thermal conductor traces that is arranged to direct heat flux generated by a heat generating component away from a temperature sensitive component, and determining a plurality of electrical connection traces based on an input schematic. At least a portion of the plurality of electrical connection traces incorporate at least a portion of the plurality of thermal conductor traces to define a conductive trace pattern that electrically connects pins of two or more components located on the substrate. The conductive trace pattern includes the plurality of thermal conductor traces and the plurality of electrical connection traces. Disruption of the plurality of thermal conductor traces is avoided while determining the plurality of electrical connection traces.

20 Claims, 11 Drawing Sheets

(52) U.S. Cl.
CPC ...... *G06F 2217/78* (2013.01); *G06F 2217/80* (2013.01); *H05K 1/0298* (2013.01); *H05K 3/0005* (2013.01); *H05K 2201/09781* (2013.01); *H05K 2203/304* (2013.01)

(58) Field of Classification Search
CPC ....... H05K 3/0005; H05K 2201/09781; H05K 2203/304
USPC ....... 716/137, 111, 120, 122, 123, 124, 127, 716/133; 703/15
See application file for complete search history.

(56) References Cited

U.S. PATENT DOCUMENTS

| | | | |
|---|---|---|---|
| 5,644,687 A | 7/1997 | Agonafer et al. | |
| 6,061,241 A * | 5/2000 | Handforth | H04M 3/005 174/250 |
| 7,308,008 B2 | 12/2007 | Freeman et al. | |
| 7,490,309 B1 | 2/2009 | Kukal et al. | |
| 7,823,102 B2 | 10/2010 | Chandra et al. | |
| 7,855,891 B1 * | 12/2010 | Ayres, III | H05K 7/20445 165/185 |
| 8,601,428 B2 | 12/2013 | Burrell et al. | |
| 9,644,829 B2 * | 5/2017 | McAlpin | F21V 29/70 |
| 2003/0062601 A1 * | 4/2003 | Harnden | H01L 23/3107 257/666 |
| 2007/0108595 A1 | 5/2007 | Refai-Ahmed | |
| 2008/0288908 A1 | 11/2008 | Hart et al. | |
| 2011/0222246 A1 | 9/2011 | Hsieh et al. | |
| 2011/0223776 A1 * | 9/2011 | Ferber, Jr. | H01R 12/00 439/39 |
| 2012/0147565 A1 | 6/2012 | I et al. | |
| 2013/0235584 A1 * | 9/2013 | McAlpin | F21V 29/22 362/249.02 |
| 2013/0267115 A1 * | 10/2013 | Mark | H01R 13/005 439/485 |
| 2014/0022731 A1 * | 1/2014 | Chen | H05K 13/00 361/707 |
| 2014/0153192 A1 * | 6/2014 | Neer | H05K 9/0058 361/704 |
| 2014/0204532 A1 * | 7/2014 | Mehring | H05K 7/20 361/689 |
| 2014/0318829 A1 * | 10/2014 | Dede | H05K 1/0203 174/251 |

OTHER PUBLICATIONS

S. Narayana, et al., "Heat Flux Manipulation With Engineering Thermal Materials," Physical Review Letters, 108 (2012) 214303.
Zain-ul-Abdein, et al., "Computational Investigation of Factors Affecting Thermal Conductivity in a Particulate Filled Composite Using Finite Element Method," International Journal of Engineering Science, 56 (2012) 86-98.
Guenneau, et al., Fick's Second Law Transformed: One Path of Cloaking in Mass Diffusion, Journal of Royal Society Interface, Mar. 27, 2013.
Stark, "Not Your Average Heat Shield: New 'Thermal' Approach to Invisibility Cloaking Hides Heat to Enhance Technology," Physical Review Letters, Apr. 1, 2013.
Schittny, et al. "Experiments on Transformation Thermodynamics; Molding the Flow of Heat", Physical Review Letters, Apr. 1, 2013.
Han, et al. "Homogeneous Thermal Cloak With Constant Conductivity and Tunable Heat Localization," Scientific Reports, Apr. 3, 2013.
Xu, et al. "Experimental Demonstration of an Ultra-Thin Three-Dimensional Cloak," Pre-publication arxiv.org, Jun. 17, 2013.
Dede, et al., "Thermal-Composite Design Optimization for Heat Flux Shielding, Focusing and Reversal," Structural and Multidisciplinary Optimization, Jul. 4, 2013.
Han, et al., "Bilayer Isotropic Thermal Clock", Pre-publication arxiv.org., Jul. 8, 2013.
Dede, et al., "Heat Flux Cloaking, Focusing, and Reversal in Ultra-Thin Composites Considering Conduction-Convection Effects,", Applied Physics Letters, Aug. 8, 2013.

* cited by examiner

CIRCUIT BOARDS WITH THERMAL CONTROL AND METHODS FOR THEIR DESIGN

TECHNICAL FIELD

The present specification generally relates circuit boards and, more particularly, circuit boards methods for designing circuit boards that satisfy thermal control goals and electrical interconnectivity goals.

BACKGROUND

In general, electrical components generate heat as a waste byproduct of their operation. The heat generated by the operation of the electrical components, therefore, is rejected into the surrounding environment. However, an increase in generation of heat may be detrimental to performance and operation of electrical components. In some applications, heat-sensitive electrical components may be located at positions on one or more circuit boards in which heat from other electrical components adversely affects operation of the heat-sensitive electrical components.

Accordingly, methods for designing and fabricating circuit boards that control the flow of thermal energy may be desired.

SUMMARY

In one embodiment, a method of designing a circuit board having an insulator substrate includes determining, by a computer, a plurality of thermal conductor traces that is arranged to direct heat flux generated by a heat generating component away from a temperature sensitive component, and determining a plurality of electrical connection traces based on an input schematic. At least a portion of the plurality of electrical connection traces incorporate at least a portion of the plurality of thermal conductor traces to define a conductive trace pattern that electrically connects pins of two or more components located on the substrate. The conductive trace pattern includes the plurality of thermal conductor traces and the plurality of electrical connection traces.

In another embodiment, a circuit board includes an insulator substrate having a surface, a heat generating component mount coupled to the surface of the insulator substrate, and a conductive trace pattern on the surface of the insulator substrate. The conductive trace pattern includes a plurality of thermal conductor traces and a plurality of electrical connection traces. The plurality of thermal conductor traces is arranged into a shielding portion and a concentrating portion. At least a portion of the plurality of electrical connection traces incorporate at least a portion of the plurality of thermal conductor traces. The conductive trace pattern electrically connects pins of two or more component mounts located on the insulator substrate. The circuit board further includes a temperature sensitive component mount coupled to the surface of the insulator substrate and positioned distally from the heat generating component mount. The shielding portion is arranged to control the direction of heat flux emitted from the heat generating component mount away from a first direction between the heat generating component mount and the temperature sensitive component mount.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference will now be made in detail to embodiments of circuit boards and methods for designing and fabricating circuit boards that control the direction of heat flux by placement of a plurality of thermal conductor traces on one or more composite laminae. The thermal conductor traces direct thermal energy along the composite lamina of the circuit board in a direction and/or at a rate that differs from the direction and/or rate of the heat flux along an isotropic insulator substrate. By providing composite laminae having thermal conductors and insulator substrates in anisotropic arrangements, thermal energy may be directed in a direction and/or at a rate that improves operation of the electrical components coupled to the composite laminae.

Further, embodiments also provide for automatic routing of electrical connection traces between various components of the circuit board in accordance with to an input schematic. The electrical connection traces are placed in consideration of the previously determined plurality of thermal conductor traces. More specifically, according to embodiments of the present disclosure, the electrical connection traces are placed and configured to minimally disrupt the placement and configuration of the plurality of thermal conductor traces so that the thermal control goals provided by the thermal conductor traces may be realized. Additionally, in some embodiments, the electrical connection traces incorporate one or more thermal conductor traces to make the desired electrical connections.

Various embodiments of circuit boards and the methods for designing and fabricating circuit boards will be described in more detail herein.

Figure 1:
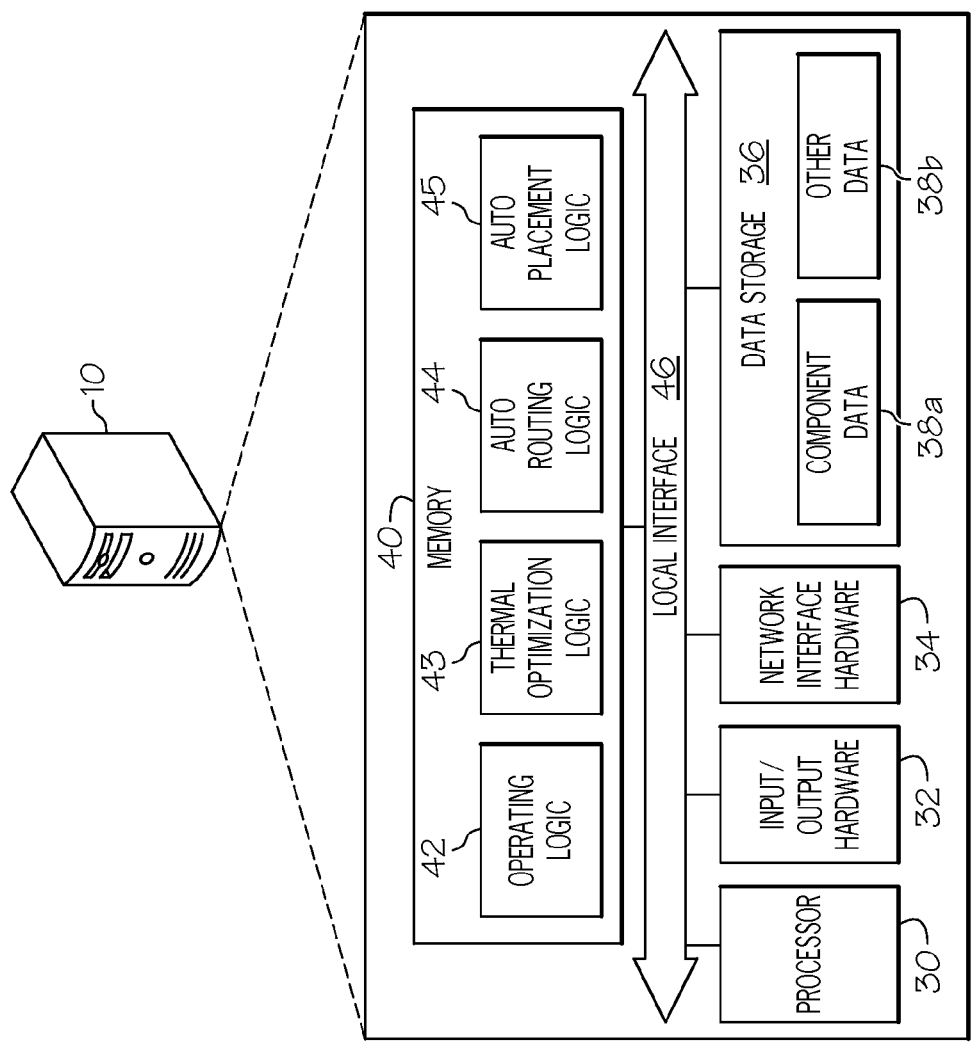
FIG. 1. schematically depicts an example computing device illustrating hardware and software that may be utilized in performing the functionalities described and illustrated herein.

FIG. 1 depicts an example computing device 10 illustrating a system for designing a circuit board having enhanced thermal control characteristics, and/or a non-transitory computer-readable medium for designing a circuit board, and/or firmware, according to embodiments shown and described herein. While in some embodiments the computing device 10 may be configured as a general purpose computer with the requisite hardware, software, and/or firmware, the computing device 10 may be configured as a special purpose computer designed specifically for performing the functionality described herein.

As also illustrated in FIG. 1, the computing device 10 may include a processor 30, input/output hardware 32, network interface hardware 34, a data storage component 36 (which may store component data 38a and other data 38b), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, thermal optimization logic 43, automatic electrical trace routing logic 44, and automatic component placement logic (each of which may be embodied as a computer program, firmware, or hardware, as an example). A local interface 46 is also included in FIG. 1 and may be implemented as a bus or other interface to facilitate communication among the components of the computing device 10.

The processor 30 may include any processing component configured to receive and execute instructions (such as from the data storage component 36 and/or memory component 40). The input/output hardware 32 may include a graphic display device (e.g., a monitor), keyboard, mouse, printer, camera, microphone, speaker, touch-screen, and/or other user input device and output device for receiving, sending, and/or presenting data. The network interface hardware 34 may include any wired or wireless networking hardware, such as a modem, LAN port, wireless fidelity (Wi-Fi) card, WiMax card, long-term evolution card, mobile communications hardware, and/or other hardware for communicating with other networks and/or devices.

It should be understood that the data storage component 36 may reside local to and/or remote from the computing device 10, and may be configured to store one or more pieces of data for access by the computing device 10 and/or other components. As illustrated in FIG. 1, the data storage component 36 may store component data 38a, which may include data regarding parameters of various electrical components, such as, but not limited to, operating temperature, heat flux, voltage requirements, and package style. As described below, the component data may be utilized by a thermal optimization routine (i.e., the thermal optimization logic 43) and an automatic electrical trace routing routine (i.e., the automatic electrical trace routing logic 44) to generate thermal conductor traces and electrical connection traces that satisfy both thermal control and electrical connectivity goals. The component data 38a may be stored in one or more data storage devices.

Similarly, other data 38b may be stored by the data storage component 36 and may include data relating to the generation of thermal conductor traces and/or electrical connection traces, as described in detail below. In one example, one or more input schematics are stored in the data storage component 36, which may be used to generate the electrical connection traces. Other data 38b may also provide additional support for functionalities described herein.

In another embodiment, the computing device 10 may be coupled to a remote server or data storage device that comprises the component data and/or the other data such that the configuration of the plurality of thermal conductor traces and the plurality of electrical connector traces are generated remotely from the computing device 10.

Included in the memory component 40 are the operating logic 42, the thermal optimization logic 43, and the automatic electrical trace routing logic 44, and the automatic component placement logic 45. The operating logic 42 may include an operating system and/or other software for managing components of the computing device 10. The thermal optimization logic 43 is configured to provide a thermal optimization routine that generates a plurality of thermal conductor traces to direct heat flux away from a temperature sensitive component, as described in detail below. The automatic electrical connection trace routing logic 44 is configured to provide for an automatic electrical connection trace routing routine that automatically generates a plurality of electrical connection traces according to an input schematic while minimally disrupting the plurality of thermal conductor traces created by the thermal optimization logic 43. In some embodiments, automatic component placement logic 45 may be utilized to automatically determine placement electrical components of an input schematic onto a circuit board. The automatic component placement logic 45 may consider factors such as interconnection between electrical components, package type, and electro-magnetic interference tolerances, for example. In other embodiments, the locations of the electrical components are determined manually.

It should be understood that the components illustrated in FIG. 1 are merely exemplary and are not intended to limit the scope of this disclosure. More specifically, while the components in FIG. 1 are illustrated as residing within the computing device 10, this is a non-limiting example. In some embodiments, one or more of the components may reside external to the computing device 10.

Figure 2:
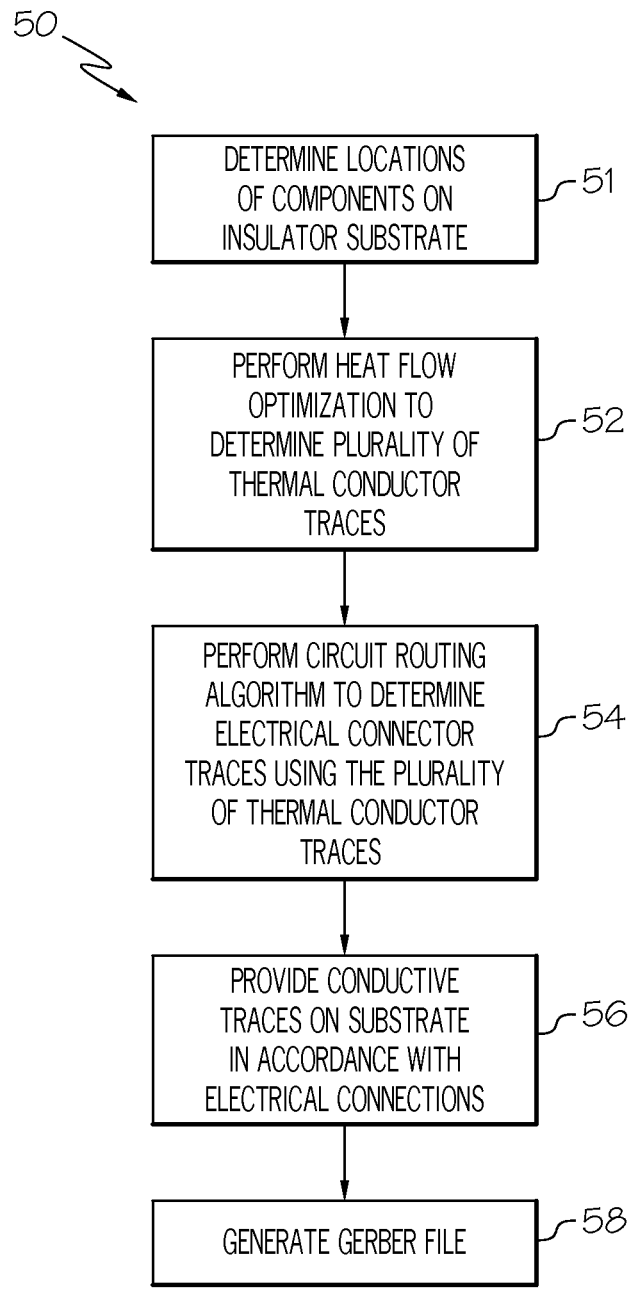
FIG. 2 graphically depicts a flowchart illustrating an example method for designing a circuit board according to one or more embodiments shown and described herein.

One example embodiment of a computer-implemented method for designing a circuit board is graphically illustrated in the flowchart 50 of FIG. 2. As described in detail below, in the example method, a thermal optimization routine is first performed to determine a location and configuration of a plurality of thermal conductor traces for heat flow management, and then an automatic electrical trace routing routine is performed to create the necessary electrical connections between electrical components while minimally disrupting the plurality of thermal conductors.

At block 51, locations for mounting the electrical components on the circuit board are determined. The locations for the electrical components may be performed manually, or automatically using a computer. For example, an automatic placement routine may be executed that optimally determines locations for the electrical components of an input circuit schematic based on factors such as size of the various electrical components, the connectivity between the various electrical components, electro-magnetic interference, and thermal properties, for example.

The electrical components to be mounted on the circuit board may include any type electrical component, such as electrical connectors, resistors, capacitors, diodes, opto-electronic devices, integrated circuits, microprocessors, power electronic devices (e.g., insulated-gate bi-polar transistors, power metal-oxide-semiconductor field effect transistors, etc.), and the like.

One or more of electrical components may generate heat as a waste byproduct of operation (i.e., "heat generating components"). Further, one or more electrical components may be temperature sensitive such that thermal energy generated by the one or more heat generating component may adversely affect operation of the one or more temperature sensitive components. As described in more detail below, the heat generating component may be a power electronics device, such as an insulated-gate bi-polar transistor, for example, while the temperature sensitive component may be a controller integrated circuit (e.g., a microcontroller), for example. Embodiments of the present disclosure provide thermal conductor traces to route heat flux generated by the one or more heat generating components away from the one or more temperature sensitive components of the circuit board.

At block 52, prior to the routing of electrical connections between the plurality of electrical components, a computer-based thermal optimization routine is performed to determine a plurality of thermal conductor traces that define a reduced thermal conduction region(s) and an enhanced thermal conduction region(s) that route heat flux away from the one or more temperature sensitive components. Generally, the thermal optimization routine may consider the thermal properties of the various electrical components (e.g., byproduct heat generation during operation at expected operational states) and the insulator substrate (e.g., thermal conductivity of the insulator substrate) to create the plurality of thermal conductor traces to route heat flux away from one or more temperature sensitive components. Additional details regarding determining the configuration of the plurality of thermal conductor traces are described in more detail below with reference to FIGS. 2-6, as well as in U.S. application Ser. Nos. 14/340,610 and 14/340,614, which are hereby incorporated by reference in their entirety.

Accordingly, the thermal optimization routine creates a plurality of thermal conductor traces that achieve thermal control goals of the design.

At block 54, the electrical connections between the various components placed on the circuit board are automatically generated by an automatic electrical trace routing routine. The automatic electrical trace routing routine generates electrical connection traces while considering the previously created plurality of thermal conductor traces. The automatic electrical trace routing routine may be a modified version of commercially available electronic design automation software (e.g., Allegro® PCB Designer software sold by Cadence® Design Systems of San Jose, Calif., USA., and DipTrace® sold by Novarm of Dnepropetrovsk, Ukraine), or a proprietary electronic design automation software with automatic electrical trace routing capabilities.

As described in more detail below with reference to FIGS. 7-12, the automatic electrical connection trace routing routine electrically connects pins of the electrical component by routing electrical connection traces that minimally disrupt the placement and configuration of the plurality of thermal conductor traces, thereby minimally reducing the effectiveness of the plurality of thermal conductor traces to route heat flux and achieve thermal control goals. Generally, the automatic electrical connection trace routing routine includes rules such that movement and/or removal of thermal conductor traces (including portions of thermal conductor traces) is avoided where other non-disruptive routes for the electrical connection traces are available. As an example and not a limitation, the total modified portion of the plurality of thermal conductor traces is less than fifteen percent from the original plurality of thermal conductor traces prior to running the automatic electrical trace routing routine. The total modified portion percentage may be calculated by dividing the total length of the modified portions of the thermal conductor traces by the total length of the original thermal conductor traces prior to forming the electrical connections.

In some instances, the electrical connection trace routing routine may route the electrical connection traces such that they incorporate one or more thermal conductor traces to electrically connect one or more pins of one or more electrical components. In this manner, the configuration of the previously determined thermal conductor traces may be minimally disturbed by the automatic electrical trace routing routine. The plurality of thermal conductor traces and the plurality of electrical connection traces collectively define a conductive trace pattern to be applied to one or more surfaces of one or more insulator substrates of the circuit board, as described in more detail below.

At block 58, data associated with the plurality of thermal conductor traces and plurality of electrical connection traces (e.g., location and dimension data) as well as data associated with other features of the circuit board (e.g., surface mount pads for electrical components, through-holes, and the like) may be provided in one or more Gerber files (or other similar vector image file format files) to be used for fabrication of the circuit board.

Figure 3:
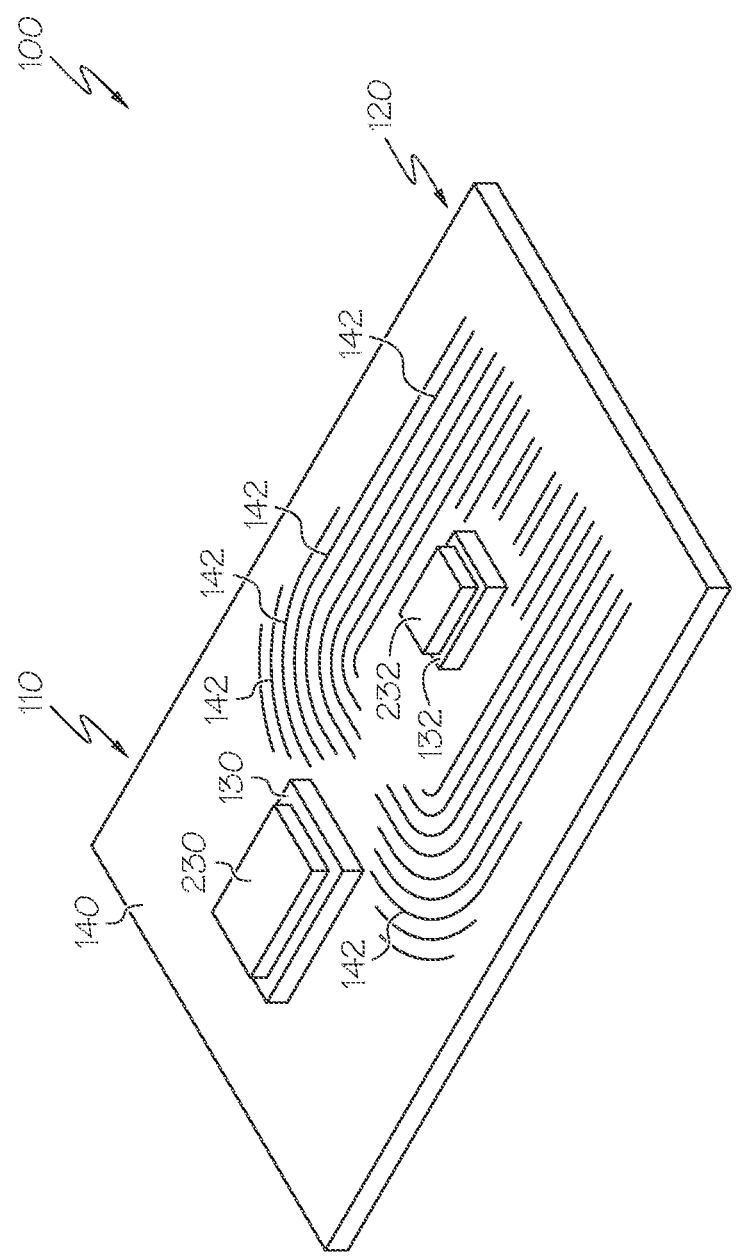
FIG. 3 schematically depicts a side perspective view of a circuit board having a single composite lamina with a plurality of thermal conductor traces prior to routing electrical connection traces according to one or more embodiments shown or described herein.

Referring now to FIG. 3, one embodiment of a circuit board 100 is depicted after generating the plurality of thermal conductor traces 142 and prior to routing of the plurality of electrical connection traces. Therefore, FIG. 3 depicts the placement of thermal conductive traces for heat flow control. It is noted that the circuit board 100 depicted in FIG. 3 is shown during the design phase and prior to actual fabrication. For ease of illustration, only two electrical components are depicted as attached to the circuit board in FIG. 3: a heat generating component 230 and a temperature sensitive component 232. It should be understood that the circuit board 100 may be populated with many more electrical components, and that the circuit board 100 of FIG. 3 is provided for illustrative purposes only.

In the illustrated embodiment, the circuit board 100 includes a composite lamina 120, which may act as an attachment substrate to which a variety of electrical components are attached. The circuit board 100 also includes a heat generating component mount 130 and a temperature sensitive component mount 132 that are both coupled to the composite lamina 120. The temperature sensitive component mount 132 is positioned distally from the heat generating component mount 130. A heat generating component 230 may be mounted to the circuit board 100 through attachment with the heat generating component mount 130. Similarly, a temperature sensitive component 232 may be mounted to the circuit board 100 through attachment with the temperature sensitive component mount 132. In other embodiments, a heat generating component 230 and a temperature sensitive component 232 may be mounted directly to the circuit board 100 without the use of a heat generating component mount 130 and a temperature sensitive component mount 132, respectively. As stated above, electrical components other than the heat generating component 230 and the temperature sensitive component 232 may be disposed on the composite lamina 120.

In the embodiment depicted in FIG. 3, the heat generating component 230 may be a power electronics device that produces heat as a byproduct of its operation. The heat generating component 230 may be a variety of electronic devices that include integrated circuits, for example, computer processing units, graphical processing units, chipsets, and the like. In some embodiments, the heat generating component 230 may be a power semiconductor device such as those utilized in power inverters, voltage rectifiers, voltage regulators, and the like. Exemplary power semiconductor devices include, but are not limited to, power insulated-gate bi-polar transistors, metal-oxide-semiconductor field-effect transistors, and the like. In another embodiment, the heat generating component 230 may include an electric motor or generator. In operation, the heat generating component 230 generally produces heat as a waste byproduct of the designed operative function of the heat generating component 230. The heat produced by the heat generating component 230 in the circuit board 100 is generally undesired, as electrical components are conventionally susceptible to temperature malfunction or permanent failure if an over-temperature condition is realized. Nevertheless, the heat generating component 230 may continue to operate throughout a wide temperature band.

Additionally, in the embodiment depicted in FIG. 3, the temperature sensitive component 232 may be selected from a variety of a temperature sensitive electronic devices including, for example planar coupler, an inductor/transformer, a high-Q resonator, a detector, a current sensing resistor, a crystal oscillator, an aligned optical component, or a human interface control button. Operation of the temperature sensitive component 232 may be adversely affected by thermal energy that is generated by the heat generating component 230. Alternatively, in other embodiments, the temperature sensitive component 232 may be a temperature sensitive electronic device that operates with increased efficiency with increased thermal energy, for example a thermo-electric generator or a piezo-electric fan. In yet other embodiments, the temperature sensitive component 232 may be a thermo-mechanical device that operates with increased efficiency with increased temperatures, for example a multi-phase heat pipe, a convective heat sink, and the like. Increased thermal energy directed to such temperature sensitive components 232 may increase performance of the temperature sensitive component 232. Accordingly, to manage the temperature of temperature sensitive components 232 coupled to the composite lamina 120, the composite lamina 120 includes heat transfer management features that modify the direction and/or intensity of the heat flux that flows along the composite lamina 120.

In the embodiment depicted in FIG. 3, the composite lamina 120 includes an insulator substrate 140 and a layer of thermal conductor traces 142 that is coupled to the insulator substrate 140. The thermal conductor traces 142 may be selected from any of a variety of materials having high thermal conduction properties, including but not limited to, copper, silver, gold, and alloys thereof. The thermal conductor traces 142 may have a thermal conductivity, $k_c$, that is greater than the thermal conductivity of the insulator substrate 140, $k_i$. In some embodiments, $k_c$ is at least an order of magnitude greater than $k_i$. The insulator substrate 140 may be selected from any of a variety of materials having low electronic conductivity, including, for example, plastics such as polypropylene, polyester, nylon, epoxy and the like, which may be combined with carbon or glass reinforcement. In one embodiment, the insulator substrate 140 may be made from FR-4, which is a glass-reinforced epoxy. The insulator substrate 140 has a thermal conductivity, $k_i$, that is less than the thermal conductivity of the thermal conductor traces 142, $k_c$. In some embodiments, the composite lamina 120 may be printed circuit boards that are fabricated according to conventional manufacturing techniques. In some embodiments, the thermal conductor traces 142 are at least partially embedded in the insulator substrate 140.

In the depicted embodiment, the thermal conductor traces 142 are generally spaced apart from one another, so that the thermal conductor traces 142 are isolated from contact with one another by insulator substrate 140. Because of the separation from one another by the insulator substrate 140, the thermal conductor traces 142 may be thermally isolated from one another, such that heat flux is more likely to be conducted along the length of the thermal conductor traces 142 than in directions transverse to the length of the thermal conductor traces 142. Determination of whether the thermal conductor traces 142 are thermally isolated from one another may be based on the thermal conductor traces 142 being electrically isolated from one another.

Figure 4:
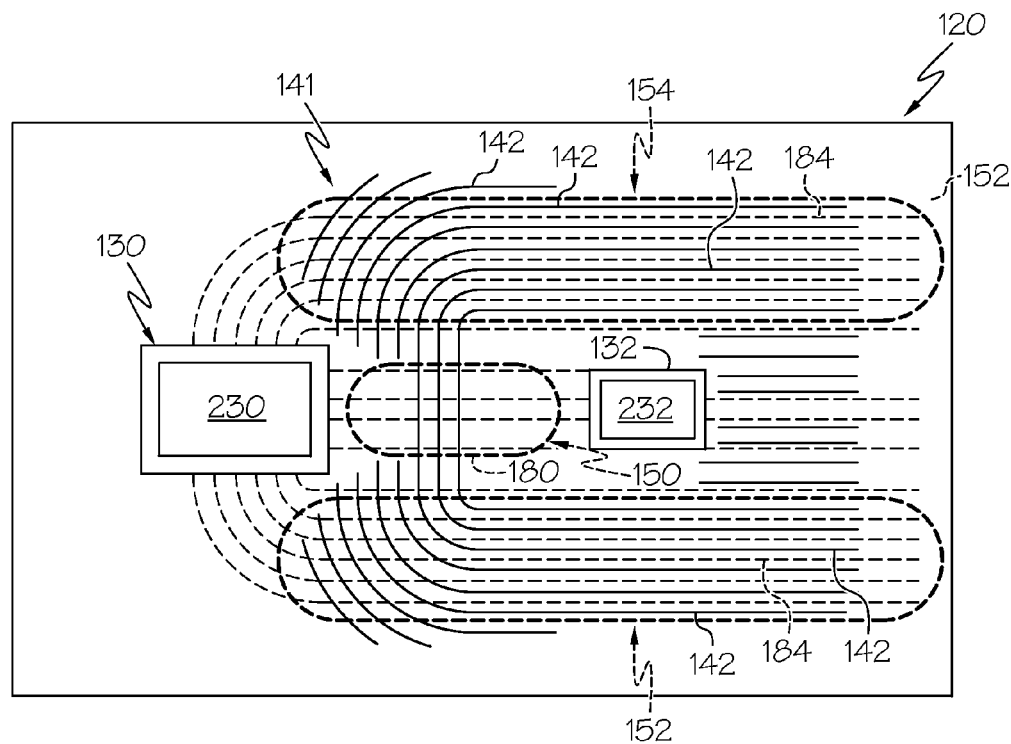
FIG. 4 schematically depicts a top view of the circuit board according depicted in FIG. 3.

Referring now to FIG. 4, which depicts a top-down view of the circuit board 100 illustrated in FIG. 3, the heat generating component mount 130 and the temperature sensitive component mount 132 are arranged relative to one another to define a plurality of shielding path projections 180 that extend from the heat generating component mount 130 towards the temperature sensitive component mount 132. In the embodiment depicted in FIG. 4, a plurality of shielding path projections 180 extend from the perimeter of the heat generating component mount 130 to the perimeter of the temperature sensitive component mount 132. The shielding path projections 180 are representative of the general direction of the flow of heat flux through an isotropic substrate between the heat generating component mount 130 to the temperature sensitive component mount 132. The circuit board 100 may also include a plurality of focusing path projections 184 that extend away from heat generating component mount 130. The focusing path projections 184 may be positioned to extend from the heat generating component mount 130 toward a desired location, such as a region away from the temperature sensitive component 232 or at the placement of a heat sink (not shown) for example. The focusing path projections 184 may be positioned such that the focusing path projections generally do not overlap the shielding path projections 180. In some embodiments, the thermal conductor traces 142 may be positioned to be generally aligned with the focusing path projections 184. In some embodiments, portions of the thermal conductor traces 142 may be generally aligned with the focusing path projections 184 at positions spaced apart from the shielding path projections 180.

As depicted in FIGS. 3 and 4, a plurality of thermal conductor traces 142 are positioned transverse to the shielding path projections 180 that extend from the heat generating component mount 130 to the temperature sensitive component mount 132. In some embodiments, the thermal conductor traces 142 are perpendicular to some or all of the shielding path projections 180 that extend from the heat generating component mount 130 to the temperature sensitive component mount 132. The thermal conductor traces 142 positioned proximate to the shielding path projections 180 are arranged into a perpendicular to the path projection in region 150. The thermal conductor traces 142 that are positioned distally from the shielding path projections 180 are arranged along the direction of the focusing projection in region 152.

The thermal conductor traces 142 in this location modify the heat flux from the heat generating component 230 to the temperature sensitive component 232. Because the thermal conductor traces 142 have a higher conduction than the insulator substrate 140, heat energy generated by the heat generating component 230 that is coupled to the heat generating component mount 130 may tend to be directed along the thermal conductor traces 142 and transverse to the shielding path projections 180 between the heat generating component mount 130 to the temperature sensitive component mount 132. By directing the heat flux transverse to the shielding path projections 180, the introduction of heat from the heat generating component 230 into the temperature sensitive component mount 132 (and therefore the temperature sensitive component 232) may be minimized. Instead, heat generated by the heat generating component 230 is directed along the thermal conductor traces 142 away from the shielding path projections 180 into regions 152, where the heat flux may be directed away from the temperature sensitive component mount 132 and toward a desired location along thermal conductor traces 142 that are substantially parallel to the focusing path projections 184 and define regions 152.

Still referring to FIGS. 3 and 4, a plurality of the thermal conductor traces 142 may be arranged in a nested configuration relative to one another, such that the plurality of thermal conductor traces 142 are generally concave around the temperature sensitive component mount 132. The plurality of thermal conductor traces 142 arranged into the nested configuration generally have path lengths evaluated within region 150 in which the thermal conductor traces 142 positioned proximate to the temperature sensitive component mount 132 are less than path lengths of the thermal conductor traces 142 that are positioned distally from the temperature sensitive component mount 132. The orientation of the nested configuration of the thermal conductor traces 142 may reduce heat flux across the thermal conductor traces 142. Instead, heat flux may be directed along the lengths of the thermal conductor traces 142, such that the heat flux can be directed away from the temperature sensitive component mount 132 and towards an element of the circuit board 100 that is targeted to heat rejection along thermal conductor traces 142 that are parallel to the focusing path projections 184.

Figure 6:
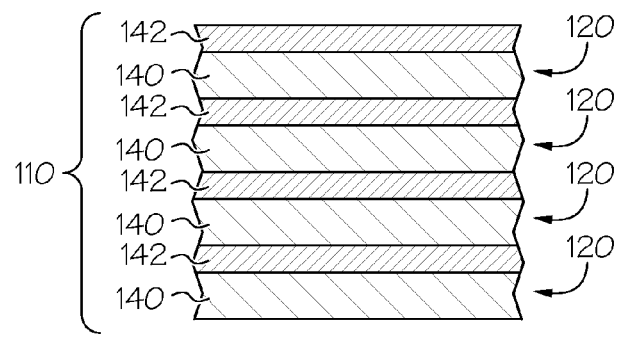
FIG. 6 schematically depicts a side sectional view of the circuit board of FIG. 5A shown along line A-A FIG. 7 schematically depicts a top view of a circuit board having a heat generating device, a temperature sensitive device, and a plurality of thermal conductor traces prior to routing electrical connection traces, according to one or more embodiments shown or described herein.
Figure 5A:
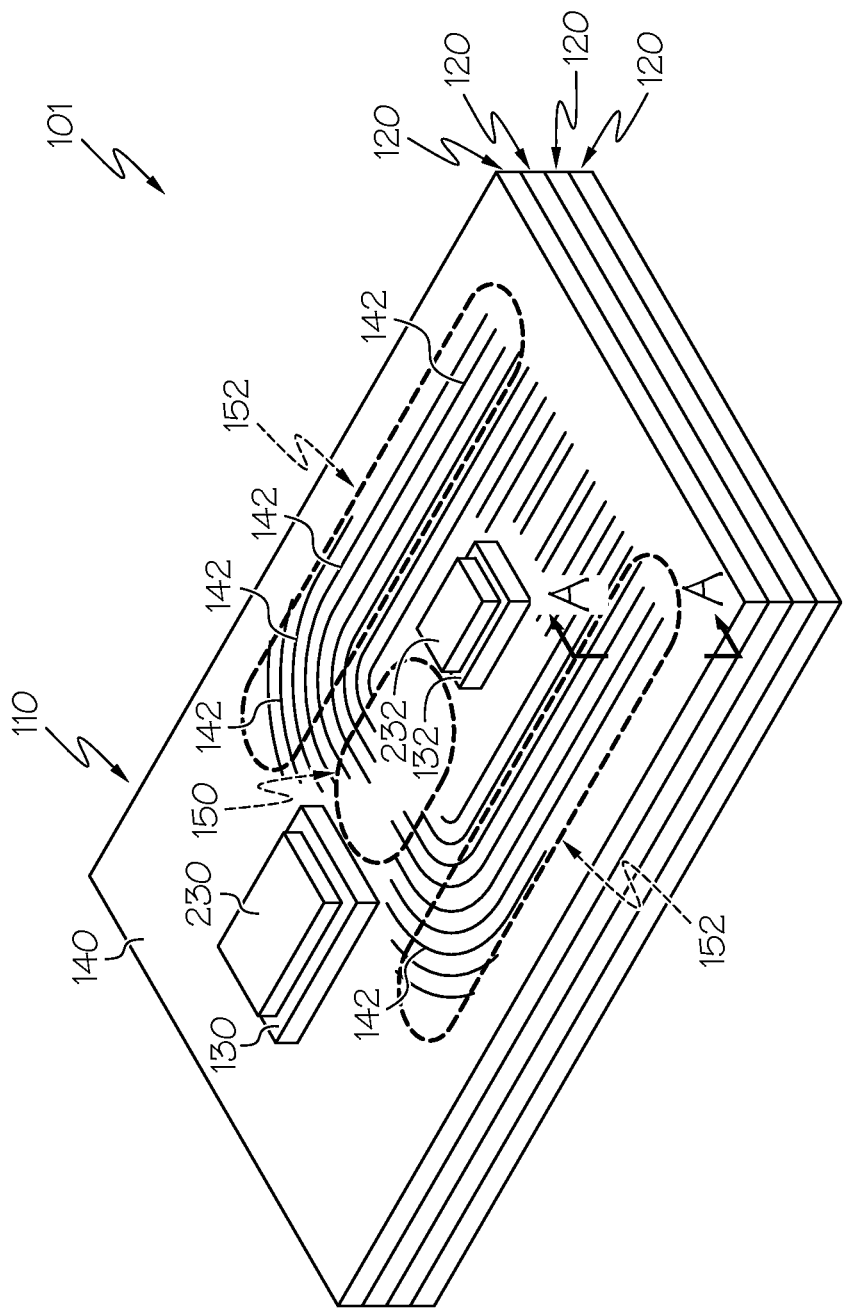
FIG. 5A schematically depicts a side perspective view of a circuit board having a plurality of composite laminae and a plurality of thermal conductor traces prior to routing electrical connection traces according to one or more embodiments shown or described herein.
Figure 5B:
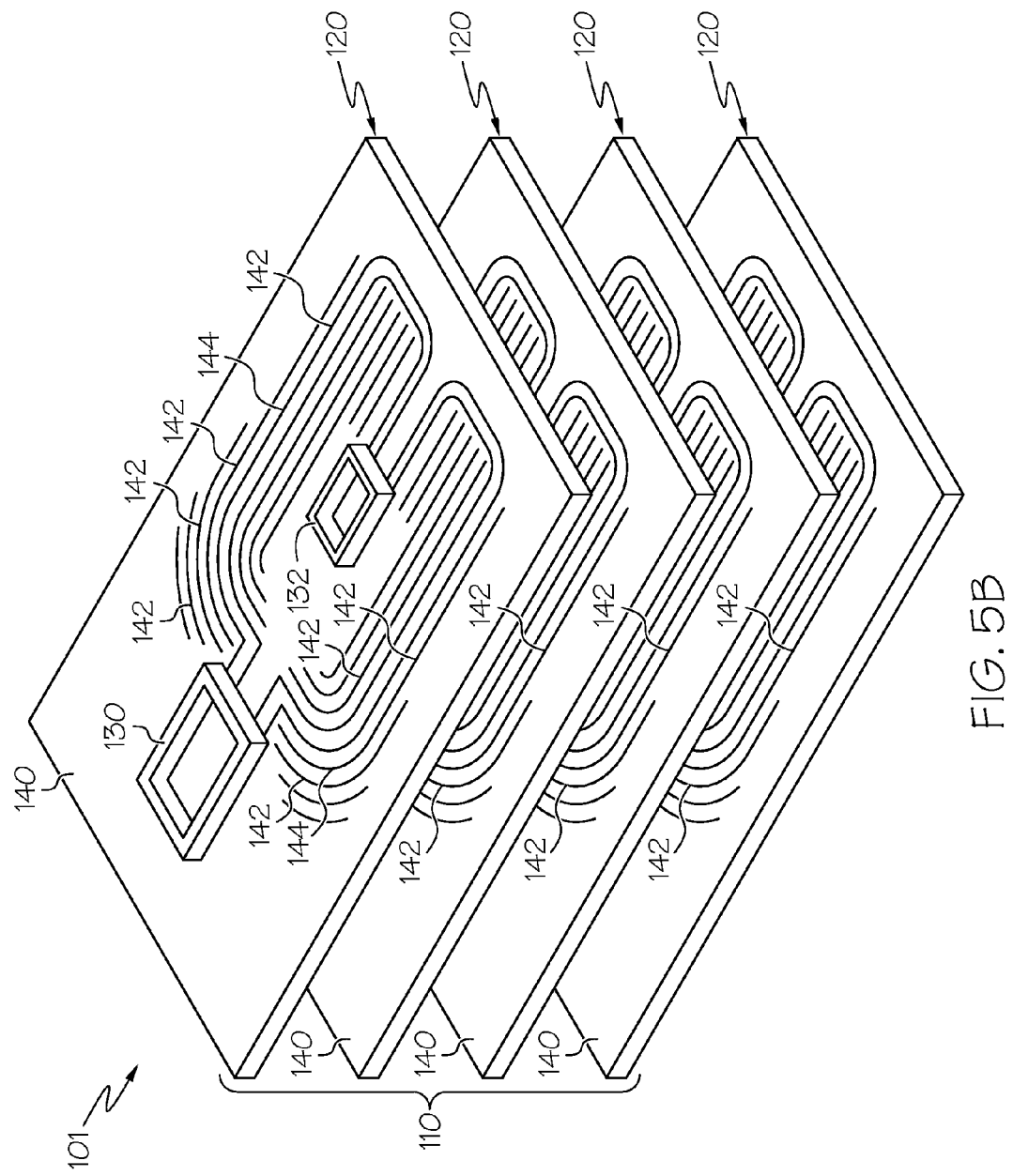
FIG. 5B schematically depicts an exploded side perspective view of the circuit board of FIG. 5A according to one or more embodiments shown or described herein.

Referring now to FIGS. 5A, 5B, and 6, a circuit board 101 having a laminate assembly 110 that includes a plurality of composite laminae 120 is depicted. The laminate assembly 110 is depicted with the composite laminae 120 in an exploded state in FIG. 5B. FIG. 6 depicts a cross-section of the circuit board 101 taken along line A-A of FIG. 5A. Similar to the embodiment of the composite lamina 120 described above with reference to FIGS. 3 and 4, the embodiment of the laminate assembly 110 of the embodiment depicted in FIGS. 5A and 5B may include a plurality of composite laminae 120 that each include a plurality of thermal conductor traces 142 that are coupled to an insulator substrate 140 in an arrangement that controls a direction of heat flux according to requirements of a particular end-user application. In the embodiment depicted in FIGS. 5A and 5B, the thermal conductor traces 142 are arranged relative to the insulator substrate 140 into region 150 between the heat generating component mount 130 and the temperature sensitive component mount 132, and into regions 152 at positions outside of region 150. By modifying the conductive heat transfer across a plurality of composite laminae 120 that form the laminate assembly 110, the heat transfer along the circuit board 100 may be targeted to provide a desired temperature profile along the plurality of composite laminae 120.

As discussed hereinabove, one or more regions 150 may preferentially direct heat flux away from the first direction between the heat generating component mount 130 and the temperature sensitive component mount 132. Regions 152 may increase heat flux along the laminate assembly 110 at positions outside of region 150. In the embodiment depicted in FIGS. 5A and 5B, regions 152 may control the direction of heat flux away from the temperature sensitive component mount 132 to reduce the temperature of the temperature sensitive component 232.

The plurality of composite laminae 120 may, through conduction of heat flux through the thermal conductor traces 142 and the insulator substrate 140, modify the heat flux by preferentially directing heat flux through the thickness of the laminate assembly 110. By incorporating multiple composite laminae 120, each having region 150 and regions 152, into the laminate assembly 110, the effects of shielding and concentrating heat flux between the heat generating component 230 and the temperature sensitive component 232 may be enhanced as compared with a single composite lamina 120. Such laminate assemblies 110 may simultaneously manage heat transfer through the plurality of composite laminae 120. Accordingly, a laminate assembly 110 having a plurality of composite laminae 120 may manage the conduction of heat flux with greater control than a single composite lamina 120 having region 150 and regions 152.

In some embodiments, the arrangement of thermal conductor traces 142 in the insulator substrate 140 may be uniform across all of the composite laminae 120. In other embodiments, the thermal conductor traces 142 may be selectively positioned across each of the composite lamina 120 for efficient usage of thermal conductor traces 142 in managing heat flux between the heat generating component 230 and the temperature sensitive component 232. For example, in some embodiments, fewer thermal conductor traces 142 may be positioned in a composite lamina 120 that is positioned distally from the heat generating component 230 as compared to a composite lamina 120 positioned proximate to the heat generating component 230. Such arrangements may account for the tendency for heat flux to diffuse through insulator substrate 140, thereby minimizing the effect of some portions of the thermal conductor traces 142 positioned within composite laminae 120 that are positioned distally from the heat generating component 230.

By controlling the direction of the heat flux with the thermal conductor traces 142 that are positioned proximate to different composite laminae 120 than the composite lamina 120 to which the heat generating component 230 and the temperature sensitive component 232 are coupled, the heat flux that is introduced to the temperature sensitive component 232 from the heat generating component 230 may be minimized.

Still referring to FIGS. 5A and 5B, laminate assemblies 110 according to the present disclosure may incorporate anisotropic arrangements of the thermal conductor traces 142 within the insulator substrate 140 to effectively direct heat flux along the laminate assembly 110 in a directional manner. For example, in the embodiment depicted in FIGS. 5A and 5B, the arrangement of the thermal conductor traces 142 effectively directs the heat flux according to a particular design, here, to minimize heat flux introduced to the temperature sensitive component mount 132 from the heat generating component mount 130. The directionality of the heat flux may be caused by the anisotropic arrangement of the thermal conductor traces 142 that increase the heat flux in one direction and decrease the heat flux in a second direction.

In the embodiment depicted in FIGS. 5A and 5B, the anisotropic arrangement may be evaluated around the temperature sensitive component mount 132. As exhibited in the depicted embodiment, the thermal conductor traces 142 are arranged in an anisotropic arrangement around the temperature sensitive component mount 132 and between the heat generating component mount 130 and the temperature sensitive component mount 132. In the embodiment depicted in FIGS. 5A and 5B, each of the composite laminae 120 includes no circular or polar symmetry of the thermal conductor traces 142 evaluated around the temperature sensitive component mount 132. Because each the composite laminae 120 of the laminate assembly 110 of FIGS. 5A and 5B has a similar arrangement of thermal conductor traces 142, the laminate assembly 110 has no cylindrical or spherical symmetry evaluated around the temperature sensitive component mount 132. Accordingly, the anisotropic arrangement of the thermal conductor traces 142 in the insulator substrate 140 maintains direction heat flux along the laminate assembly 110.

Embodiments of the composite laminae 120 having thermal conductor traces 142 at least partially embedded in the insulator substrate 140 are generally described herein, with respect to the effects of the thermal conductor traces 142 and the insulator substrate 140 on steady-state heat transfer along the circuit board 100. It should be understood, however, that the particular material used as the thermal conductor traces 142 and the dimensions of the thermal conductor traces 142 relative to the insulator substrate 140 may be modified to accommodate the thermal capacitance of the circuit board 100, thereby managing the transient thermal response of the circuit board 100.

The thermal conductor traces 142 may be arranged on one or more composite laminae 120 to optimally route heat flux away from the temperature sensitive component 232. After an optimal topology of the thermal conductor traces 142 is computer-generated by the thermal optimization routine, an automatic electrical trace routing routine is applied to electrically connect pins of various electrical components (e.g., the heat generating component 230 and/or the temperature sensitive component 232).

Figure 7:
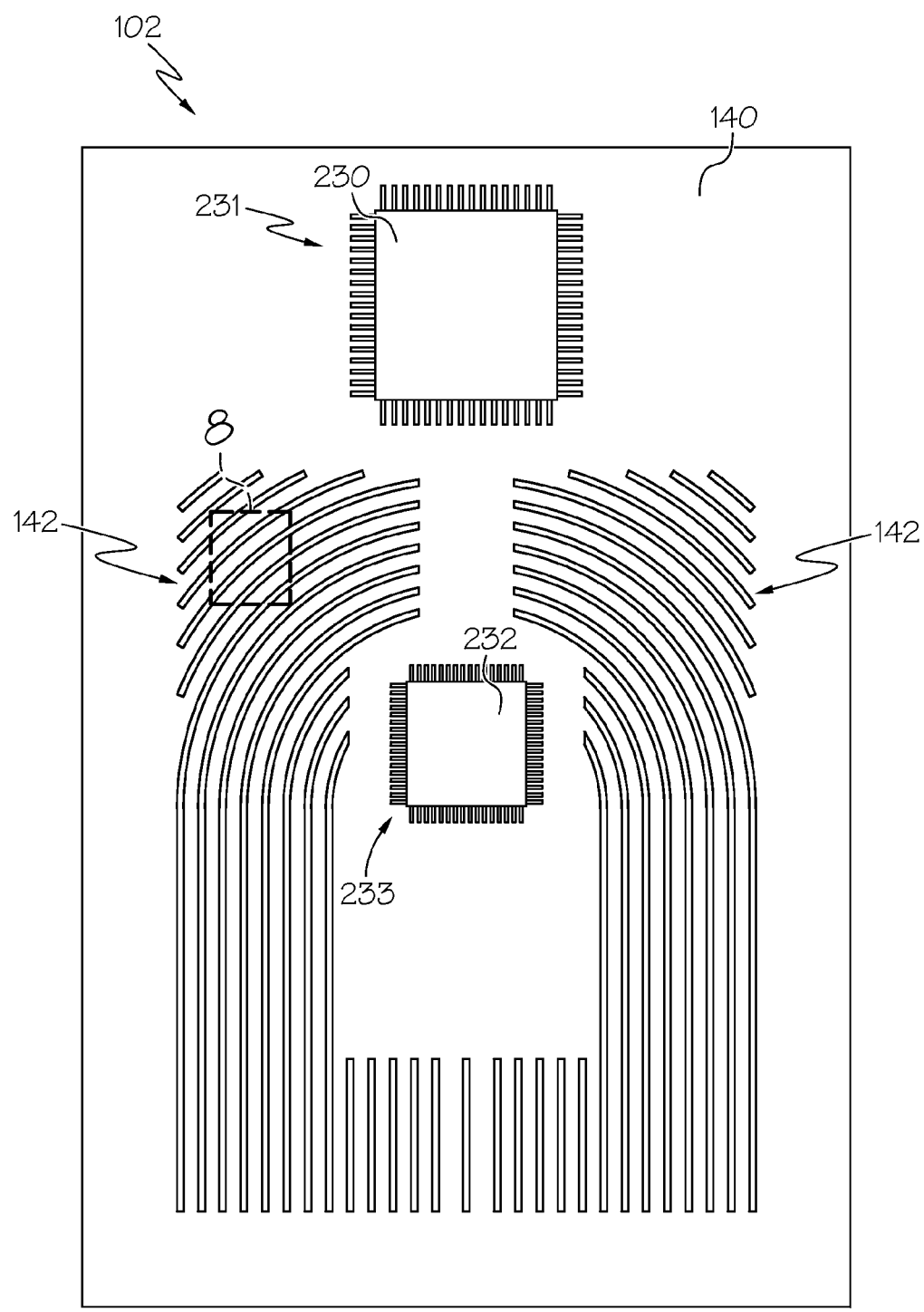

Referring now to FIG. 7, a top-down view of an example circuit board 102 having a plurality of thermal conductor traces 142 is depicted prior to running an automatic electrical trace routing routine. The example circuit board 102 includes a heat generating component 230 having a plurality of pins 231, and a temperature sensitive component 232 also have a plurality of pins 233. As described above with respect to the embodiment depicted in FIGS. 3-6, the temperature sensitive component 232 is disposed on the insulator substrate 140 distally from the heat generating component 230. A plurality of thermal conductor traces 142 direct heat flux away from the temperature sensitive component 232, as described above. It should be understood that embodiments may include more than one heat generating component and more than one temperature sensitive component.

Figure 8:
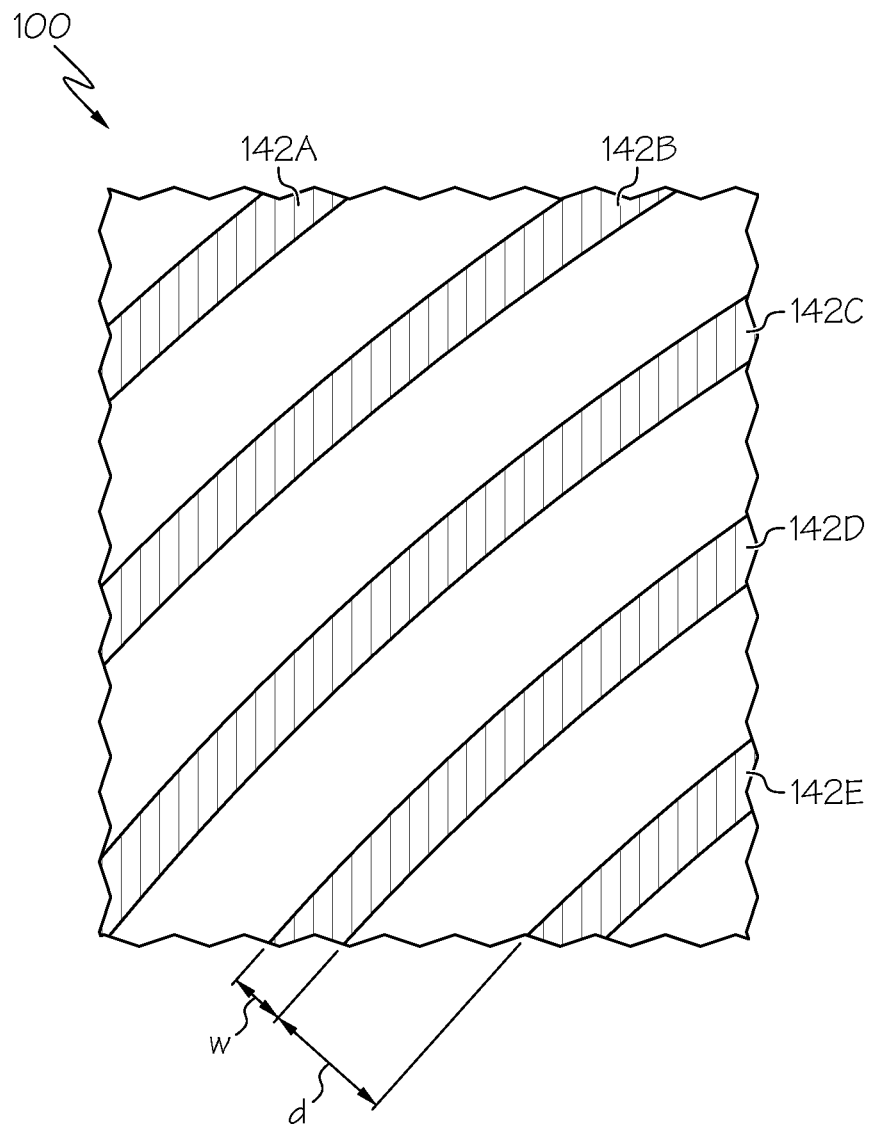
FIG. 8 schematically depicts a close-up view of several thermal conductor traces depicted in FIG. 7 according to one or more embodiments shown or described herein.

FIG. 8 depicts a close up view of the boxed region of FIG. 7. The thermal conductor traces 142A-142E shown in FIG. 8 are arranged in a nested array that is concave relative to the temperature sensitive component 232. Each thermal conductor trace 142A-142E has a width w and are separated from one another by a distance d. In some embodiments, the width w and distance d varies between individual thermal conductor traces. The width w and distance d may be determined by a thermal optimization routine.

The automatic electrical trace routing routine creates electrical connections between electrical components a plurality of electrical traces (e.g., the heat generating component 230 and the temperature sensitive component 232) while minimally disrupting the previously determined plurality of thermal conductor traces. In other words, the automatic electrical trace routing routine avoids displacement of the plurality of thermal conductor traces as the plurality of electrical connection traces are determined. Disruption of the thermal conductor traces may include removal of thermal conductor trace material (e.g., isolating breaks), addition of conductor material between thermal conductor traces (e.g., conductive bridges), and displacement of thermal conductor traces.

The automatic electrical trace routing routine may utilize an electrical schematic as an input to generate the plurality of electrical connection traces. As stated above, the automatic electrical trace routing routine may be configured as a modified commercially available electronic design automation software package or a propriety software package programmed to automatically route electrical connections while considering the plurality of thermal conductor traces.

In some embodiments, the plurality of electrical connection traces incorporates one or more thermal conductor traces 142. For example, electrically conductive bridges may be positioned between adjacent thermal conductor traces when electrical connectivity is desired, and small isolating breaks in a thermal conductor trace may be created when electrical isolation is desired.

Figure 9:
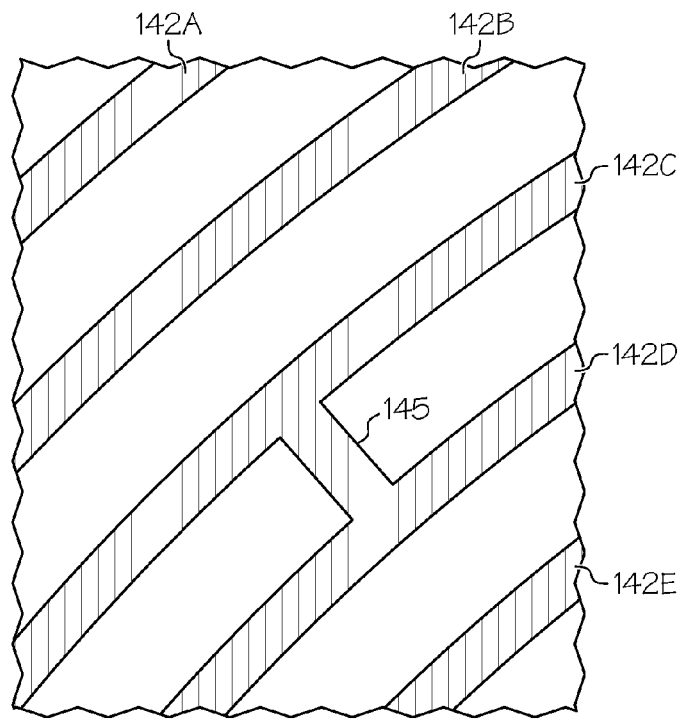
FIG. 9 schematically depicts a close-up view of two adjacent thermal conductor traces electrically coupled by an electrically conductive bridge according to one or more embodiments shown or described herein.

Referring now to FIG. 9, the automatic electrical trace routing routine may have determined that electrically connecting thermal conductor trace 142C to thermal conductor trace 142D was desirable to achieve electrical connection goals. An electrically conductive bridge 145 is disposed between thermal conductor trace 142C and thermal conductor trace 142D to form an electrical connection therebetween. Accordingly, FIG. 9 schematically illustrates an example electrical connection between adjacent thermal conductor traces. It is noted that the width of the electrically conductive bridge 145 may be as small as possible to minimize altering the thermal control goals achieved by the plurality of thermal conductor traces 142. In other words, a thinner electrically conductive bridge will have less thermal cross-talk between adjacent thermal conductor traces than a thicker electrically conductive bridge.

Figure 10:
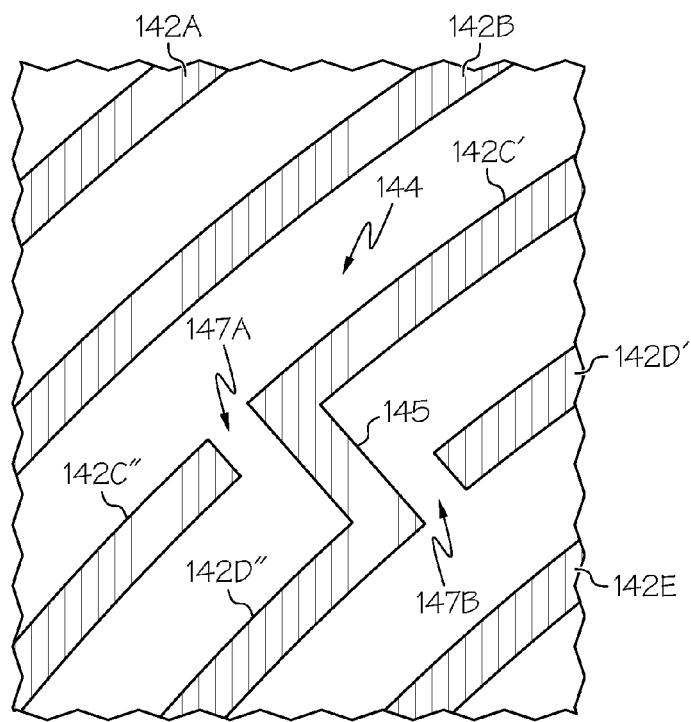
FIG. 10 schematically depicts a close-up view of two adjacent thermal conductor traces electrically coupled and electrically isolated by an electrically conductive bridge and isolating breaks, respectively, according to one or more embodiments shown or described herein.

FIG. 10 depicts an example where both electrical isolation and connectivity are applied to adjacent thermal conductor traces by the automatic electrical trace routing routine (i.e., thermal conductor trace 142C and thermal conductor trace 142D in the illustrated embodiment). Such a configuration may provide an electrical connection trace that both electrically couples and electrically isolates portions of adjacent thermal conductor traces. In the illustrated embodiment, a first isolating break 147A is made in thermal conductor trace 142C to separate it into a first segment 142C' and a second segment 142C", and a second isolating break 147B is made in thermal conductor trace 142D to separate it into a first segment 142D' and a second segment 142D". Further, the automatic electrical trace routing routine in the illustrated example has placed an electrically conductive bridge 145 to electrically couple first segment 142C' to second segment 142D", which provides for an electrical trace 144 that incorporates both first segment 142C' and second segment 142D". Second segment 142C" and first segment 142D' are isolated from this electrical trace 144 by the first and second isolating breaks 147A and 147B. The second segment 142C" and the first segment 142D' may be utilized for other electrical connections, for example.

In some embodiments, the isolating break may have a width that is as small as possible to minimize the disruption of heat transfer along the particular thermal control trace. For example, a large isolating break may alter the routing of heat flux achieved by the plurality of thermal conductor trace according to the thermal optimization routine.

Figure 11A:
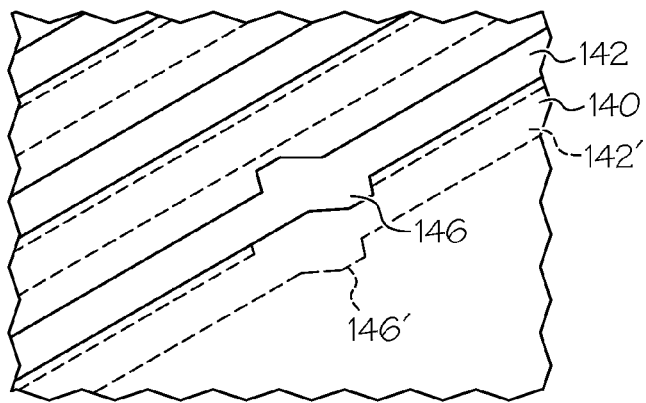
FIGS. 11A-11C schematically depict the formation of a via between opposing thermal conductor traces according to one or more embodiments shown or described herein.
Figure 11B:
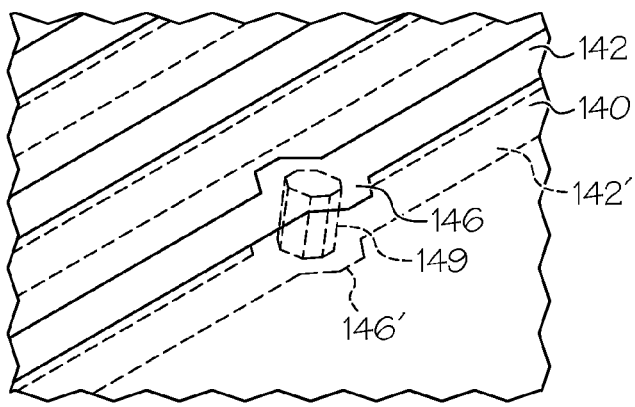
Figure 11C:
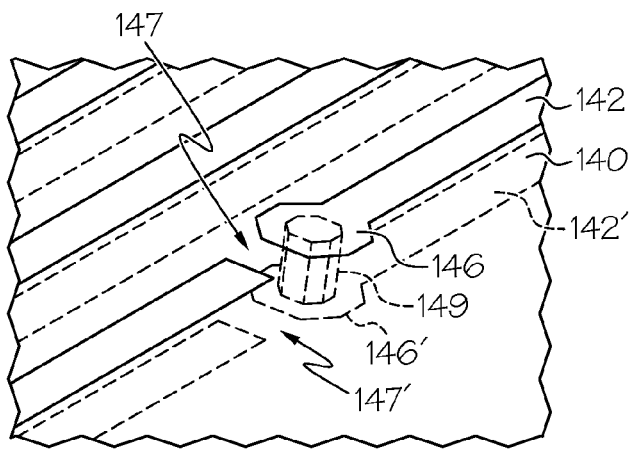

FIGS. 11A-11C illustrate how electrical vias may be provided through one or more insulator substrates 140 to achieve electrical connectivity and/or thermal control goals. As shown in FIG. 11A, a first thermal conductor trace 142 (e.g., an upper thermal conductor trace) is positioned on a first surface of the insulator substrate 140 and a second thermal conductor trace 142' (e.g., a lower thermal conductor trace) is positioned on a second surface of the insulator substrate 140. A first via pad 146 is shown as integrated with the first thermal conductor trace 142 and aligned with a second via pad 146' integrated with the second conductor trace 142'. Next, an electrically conductive via 149 is positioned between the first via pad 146 and the second via pad 146' (FIG. 11B). Thus, the electrically conductive via 149 thermally and electrically connects the first thermal conductor trace 142 to the second thermal conductor trace 142'. Finally, in the illustrated example, a first isolating break 147 is positioned adjacent to the first via pad 146, and a second isolating break 147' is positioned adjacent to the second via pad 146' to provide desired electrical isolation according to the electrical connectivity and/or thermal control goals (FIG. 11C).

Figure 12:
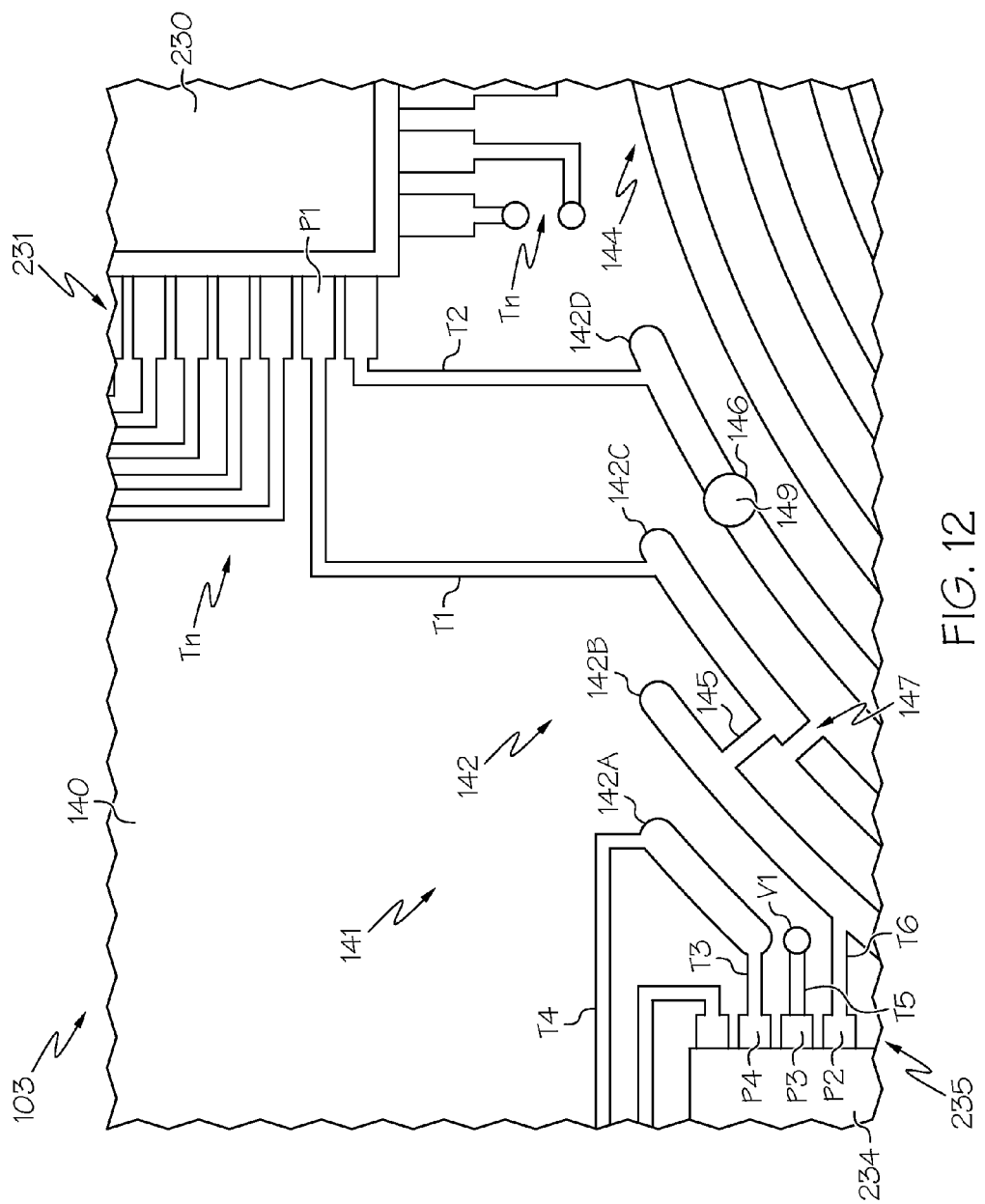
FIG. 12 schematically depicts a partial top view of an example circuit board having a plurality of thermal conductor traces and a plurality of electrical connection traces according to one or more embodiments shown or described herein.

Referring now to FIG. 12, a portion of an example circuit board assembly 103 following application of both the thermal optimization routine and the automatic electrical trace routing routine. It is noted that the circuit board 103 provided in FIG. 12 may illustrate a computer-generated representation of the circuit board 103, or a physical implementation of the circuit board 103 following actual fabrication. In the illustrated embodiment, a plurality of electrical connection traces (e.g., T1, T2, Tn, etc.) and a plurality of thermal conductor traces 142 (142A, 142B, 142C and 142D are specifically numbered in FIG. 12) collectively define a conductive trace pattern that is provided on a surface of an insulator substrate 140. It should be understood that the example circuit board 103 may have additional layers of conductive trace patterns and additional composite laminae that are not visible in the top-down view provided by FIG. 12. It should also be understood that FIG. 12 is provided for illustrative purposes only, and that other circuit board configurations are also possible.

Example circuit board 103 includes a heat generating component 230, a temperature sensitive component (not shown), and electrical component 234. The thermal optimization routine determined the configuration and placement of the thermal conductor traces 142, while the automatic electrical trace routing routine determined the configuration and placement of the plurality of electrical connection traces (e.g., electrical connection traces Tn). As an example, pin P1 of the heat generating component 230 is electrically connected to pin P2 of electrical component 234 by an electrical connection defined by electrical connection trace T1, a portion of thermal conductor trace 142C, electrically conductive bridge 145, electrical conductor 142B, and electrical trace T6. An isolating break 147 is provided in thermal conductor trace 142C to provide for electrical isolation (e.g., for electrical connections not shown in FIG. 12).

Electrical connection trace T2 is electrically connected to thermal conductor trace 142D in the illustrated example. The thermal conductor trace 142D includes a via pad 146 and corresponding via 149 to electrically and thermally couple the thermal conductor trace 142D to additional conductors associated with one or more composite laminae 120 (not shown).

Pin P3 of electrical component 234 is electrically connected to a via V1 by electrical connection trace T5, while pin P4 is electrically connected to thermal conductor trace 142A by electrical connection trace T3. Further, electrical connection trace T4 is electrically connected to thermal conductor trace 142A. Miscellaneous electrical connections (labeled Tn or unlabeled) lead to undisclosed locations on or within the circuit board 103.

It should now be understood that embodiments of the present disclosure are directed to computer-implemented methods for the design and fabrication of circuit boards that satisfy both thermal control and electrical connectivity goals. More specifically, embodiments first apply a thermal optimization routine to develop a plurality of thermal conductor traces that controls a direction of heat flux created by one or more heat generating components away from one or more temperature sensitive component and toward one or more desired locations. Through selective positioning of the thermal conductor traces in an insulator substrate of the circuit board, the heat flux can be effectively directed to minimize increased temperature surrounding the temperature sensitive component.

Next, an automatic electrical connection trace routing routine is run according to an input schematic. The automatic electrical connection trace routing routine is configured to minimally disrupt the placement and configuration of the plurality of thermal conductor traces while automatically placing a plurality of electrical connection traces. In some instances, the plurality of electrical connection traces may incorporate one or more thermal conductor traces to make the desired electrical connections between pins of various electrical components.

While specific mention has been made herein to conductive heat transfer properties offered by the circuit boards described herein, the discussion hereinabove has been directed to heat transfer at steady-state operation. It should be understood that the parameters of the heat transfer management apparatuses may be modified to suit particular end-user requirements, including management of transient heat transfer. Management of heat flux in a transient time frame may be accommodated by modifying the materials used circuit boards, for example, the thermal conductor traces, the insulator substrate, the vias, the heat generating component mount, the temperatures sensitive component mount, and the heat sink. Additionally, for management of heat flux in a transient time frame along any one composite laminae of the circuit board, the configuration of the thermal conductor traces relative to the insulator substrate may be modified, including modifying the cross-sectional area of the thermal conductor traces as well as the relative spacing between adjacent thermal conductor traces and the shape of the thermal conductor traces. The listing of elements that may be modified to accommodate certain transient heat transfer characteristics should be considered to be illustrative and non-limiting examples.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of designing a circuit board comprising an insulator substrate, the method comprising:
   determining, by a computer, a plurality of thermal conductor traces that are to be arranged on the circuit board to direct heat flux generated by a heat generating component away from a temperature sensitive component;
   determining, by the computer, a plurality of electrical connection traces that are to be arranged on the circuit board, based on an input schematic and the determined plurality of thermal conductor traces, wherein at least a portion of the plurality of electrical connection traces incorporate at least a portion of the plurality of thermal conductor traces to define a conductive trace pattern that electrically connects pins of two or more components located on the insulator substrate, the conductive trace pattern comprising the plurality of thermal conductor traces and the plurality of electrical connection traces; and
   causing the circuit board based on the determined plurality of thermal conductor traces and the determined plurality of electrical connection traces to be fabricated.

2. The method of claim 1, wherein disruption of the plurality of thermal conductor traces is avoided while determining the plurality of electrical connection traces.

3. The method of claim 1, wherein, after the determination of the plurality of electrical connection traces, a total modified portion of the plurality of thermal conductor traces is less than fifteen percent of the original plurality of thermal conductor traces as calculated by dividing the total length of modified portions of the thermal conductor traces by the total length of the original thermal conductor traces.

4. The method of claim 1, wherein:
   the plurality of thermal conductor traces are determined by defining a shielding path projection that extends from the heat generating component towards the temperature sensitive component; and
   at least one thermal conductor trace of the plurality of thermal conductor traces is transverse to the shielding path projection between the heat generating component and the temperature sensitive component to direct heat flux away from the temperature sensitive component.

5. The method of claim 1, wherein at least a portion of the plurality of thermal conductor traces are positioned in a nested array that is concave relative to the temperature sensitive component.

6. The method of claim 1, wherein the two or more components comprises the heat generating component and the temperature sensitive component, and at least a portion of the plurality of electrical connection traces electrically couple one or more pins of the heat generating component to one or more pins of the temperature sensitive component using one or more thermal conductor traces of the plurality of thermal conductor traces.

7. The method of claim 1, wherein determining the plurality of electrical connection traces further comprises modifying one or more thermal conductor traces of the plurality of thermal conductor traces according to the input schematic.

8. The method of claim 1, wherein the two or more components comprise an additional electrical component other than the heat generating component and the temperature sensitive component, and one or more electrical connection traces of the plurality of electrical connection traces electrically connect one or more pins of the additional electrical component to one or more pins of the heat generating component and/or the temperature sensitive component.

9. The method of claim 8, wherein the one or more pins of the additional electrical component are electrically connected to the one or more pins of the heat generating component and/or the temperature sensitive component at least partially by one or more thermal conductor traces of the plurality of thermal conductor traces.

10. The method of claim 1, wherein determining the plurality of electrical connection traces comprises forming an isolating break in one or more thermal conductor traces of the plurality of thermal conductor traces.

11. The method of claim 1, wherein determining the plurality of electrical connection traces comprises forming a conductive bridge between adjacent thermal conductor traces of the plurality of thermal conductor traces.

12. The method of claim 1, wherein a position of the plurality of thermal conductor traces is unmoved following determining the plurality of electrical connection traces.

13. The method of claim 1, further comprising determining a second plurality of thermal conductor traces for a second surface of the insulator substrate, wherein the second plurality of thermal conductor traces are arranged to direct heat flux generated by the heat generating component away from the temperature sensitive component.

14. The method of claim 13, wherein the second plurality of thermal conductor traces are identical to the plurality of thermal conductor traces prior to determining the plurality of electrical connection traces.

15. The method of claim 14, wherein the second plurality of thermal conductor traces are different from the plurality of thermal conductor traces after determining the plurality of electrical connection traces.

16. The method of claim 13, wherein determining the plurality of electrical connection traces comprises positioning a conductive via through the insulator substrate to electrically connect at least one thermal conductor trace on the surface of the insulator substrate to at least one thermal conductor trace on the second surface of the insulator substrate.

17. A method of fabricating a circuit board comprising an insulator substrate, the method comprising:

determining, by a computer, a plurality of thermal conductor traces that are to be arranged on the circuit board, to direct heat flux generated by a heat generating component away from a temperature sensitive component;

determining, by the computer, a plurality of electrical connection traces that are to be arranged on the circuit board, based on an input schematic and the determined plurality of thermal conductor traces, wherein at least a portion of the plurality of electrical connection traces incorporate at least a portion of the plurality of thermal conductor traces to define a conductive trace pattern that electrically connects pins of two or more components located on the insulator substrate, the conductive trace pattern comprising the plurality of thermal conductor traces and the plurality of electrical connection traces; and fabricating the circuit board based on the determined plurality of thermal conductor traces and the determined plurality of electrical connection traces.

18. The method of claim 17 wherein after the determination of the plurality of electrical connection traces, a total modified portion of the plurality of thermal conductor traces is less than fifteen percent of the original plurality of thermal conductor traces as calculated dividing the total length of the modified portions of the thermal conductor traces by the total length of the original thermal conductor traces.

19. The method of claim 17 wherein:

the plurality of thermal conductor traces are determined by defining a shielding path projection that extends from the heat generating component towards the temperature sensitive component; and at least one thermal conductor trace of the plurality of thermal conductor traces is transverse to the shielding path projection between the heat generating component and the temperature sensitive component to direct heat flux away from the temperature sensitive component.

20. The method of claim 17 wherein at least a portion of the plurality of thermal conductor traces are positioned in a nested array that is concave relative to the temperature sensitive component.

* * * * *